United States Patent
Murray (10) Patent No.: US 9,840,673 B2
(45) Date of Patent: Dec. 12, 2017

(54) SYSTEMS AND METHODS FOR REMOVING SULFUR AND HALOGENS

(71) Applicant: AQUIFER MAINTENANCE & PERFORMANCE SYSTEMS, INC., West Palm Beach, FL (US)

(72) Inventor: James Richard Murray, West Palm Beach, FL (US)

(73) Assignee: Aquifer Maintenance & Performance Systems, Inc., West Palm Beach, FL (US)

( * ) Notice: Subject to any disclaimer, the term of this patent is extended or adjusted under 35 U.S.C. 154(b) by 138 days.

(21) Appl. No.: 14/589,640

(22) Filed: Jan. 5, 2015

(65) Prior Publication Data

US 2015/0191661 A1    Jul. 9, 2015

Related U.S. Application Data

(60) Provisional application No. 61/924,028, filed on Jan. 6, 2014.

(51) Int. Cl.
*C01G 53/02* (2006.01)
*C10G 53/02* (2006.01)
*B01J 19/08* (2006.01)

(52) U.S. Cl.
CPC ............ *C10G 53/02* (2013.01); *B01J 19/087* (2013.01); *B01J 2219/0869* (2013.01); *B01J 2219/0871* (2013.01); *B01J 2219/0877* (2013.01)

(58) Field of Classification Search
CPC . C10G 53/02; B01J 19/087; B01J 2219/0869; B01J 2219/0871; B01J 2219/0877; B01J 3/006; B01J 4/002; B01J 19/0006; B01J 19/18; B01J 19/1862; B01J 19/26; B01J 2219/00006; B01J 2219/00162; B01J 2219/00182; B01J 2219/002; B01J 2219/00231; B01J 2219/00236; B01D 17/044; C02F 1/725; C02F 1/763; C02F 1/78; C02F 1/72; C02F 1/722; C02F 1/74; C02F 1/76; C02F 2201/782; B01F 5/04; B01F 3/04539; B01F 2003/04297; B01F 2003/04319; B01F 2003/0439; B01F 2003/04695;
(Continued)

(56) References Cited

U.S. PATENT DOCUMENTS 1,857,461 A    5/1932  Lambert et al.
2,621,197 A    12/1952 Thurman
(Continued)

FOREIGN PATENT DOCUMENTS

GB      374915      *  4/1931
GB      374915   A     6/1932
WO    98/08923   A1    3/1998

OTHER PUBLICATIONS

PCT/US2015/010144 International Search Report dated Apr. 27, 2015.
EP15733194 Extended European Search Report dated Oct. 2, 2017.

*Primary Examiner* — Xiuyu Tai
(74) *Attorney, Agent, or Firm* — Wagenknecht IP Law Group PC (57) ABSTRACT

Provided herein are systems and methods for removing halogens and sulfur from used oil. The used oil is heated and aerated, followed by rapid vaporization and cooling. The cooled oil is then subjected to an electrical field before being filtered.

13 Claims, 7 Drawing Sheets

(58) Field of Classification Search
CPC .. B01F 2003/04858; B01F 2003/04879; Y10S 210/908; Y02W 10/37; B03C 5/02; C10M 175/0066
See application file for complete search history.

(56) References Cited

U.S. PATENT DOCUMENTS

| | | |
|---|---|---|
| 3,366,551 A | 1/1968 | Kaso |
| 4,151,072 A | 4/1979 | Nowack et al. |
| 6,106,699 A | 8/2000 | MacDonald et al. |
| 6,251,289 B1 * | 6/2001 | Sherman ............. B01F 3/04539 210/192 |
| 6,351,367 B1 * | 2/2002 | Mogi .................... B25B 11/002 279/128 |
| 2001/0007314 A1 | 7/2001 | Sherman |
| 2006/0135373 A1 | 6/2006 | Jeong et al. |
| 2008/0070816 A1 * | 3/2008 | Martin de Julian ........................ C10M 175/0058 508/111 |
| 2013/0270723 A1 * | 10/2013 | Grotheim ........... B01D 17/0205 261/112.1 |

* cited by examiner

SYSTEMS AND METHODS FOR REMOVING SULFUR AND HALOGENS

CROSS REFERENCE TO RELATED APPLICATION(S)

This application claims the benefit of priority under 35 U.S.C. §119(e) of U.S. Ser. No. 61/924,028, filed Jan. 6, 2014, the entire content of which is incorporated herein by reference.

BACKGROUND OF THE INVENTION

1. Field of the Invention

The invention relates generally to used oil treatment and more specifically to systems and methods for converting halogens in oil to sodium containing compounds for removal therefrom.

2. Background Information

Fossil fuels are the largest and most widely used source of power in the world, offering high efficiency, proven performance, and relatively low prices. There are many different types of fossil fuels, ranging from petroleum fractions to coal, tar sands, and shale oil, with uses ranging from consumer uses such as automotive engines and home heating to commercial uses such as boilers, furnaces, smelting units, and power plants.

Fossil fuels and other crude oil fractions and products derived from natural sources contain a vast array of hydrocarbons differing widely in molecular weight, boiling and melting points, reactivity, and ease of processing. Many industrial processes have been developed to upgrade these materials by removing, diluting, or converting the heavier components or those that tend to polymerize or otherwise solidify, notably the olefins, aromatics, and fused-ring compounds such as naphthalenes, indanes and indenes, anthracenes, and phenanthracenes.

For fossil fuels in particular, a growing concern is the need to remove sulfur compounds. Sulfur from sulfur compounds causes corrosion in pipeline, pumping, and refining equipment, the poisoning of catalysts used in the refining and combustion of fossil fuels, and the premature failure of combustion engines. Sulfur poisons the catalytic converters used in diesel-powered trucks and buses to control the emissions of oxides of nitrogen ($NO_x$). Sulfur also causes an increase in particulate (soot) emissions from trucks and buses by degrading the soot traps used on these vehicles. The burning of sulfur-containing fuel produces sulfur dioxide which enters the atmosphere as acid rain, inflicting harm on agriculture and wildlife, and causing hazards to human health.

Another growing concern in fossil fuels is total halogen content in used oil. According to the U.S. Environmental Protection Agency (EPA), used oil containing more than 1,000 ppm total halogens is presumed to be a hazardous waste because it has been mixed with a halogenated hazardous waste. Since halogens form toxic compounds that have negative effects on human health and the environment, a need exists for methods and apparatus to efficiently remove such halogens from used oil.

SUMMARY OF THE INVENTION

The present invention is based on the finding that used oil can be treated for removal of halogen and/or sulfur content.

In one aspect, the invention provides a method of treating oil. The method includes heating oil that is inputted into the system, aerating the heated oil to create an oil foam, subjecting the oil foam to a vacuum to condense the oil, cooling the condensed oil, contacting the condensed oil with a sintered metal, subjecting the cooled oil to an electrical field, and filtering the electrified oil. The oil may be used oil. In various embodiments, the oil is heated to about 82° F.-100° F. In various embodiments, the temperature is raised to approximately 85° F.-90° F. In certain embodiments, the temperature is raised to approximately 88° F. In various embodiments, the electrical field is a 0-90 volt electrical field is produced through sintered copper. In various embodiments, the electrical field is a 0-250 volt electrical field is produced through sintered titanium. The step of aerating may include passing the oil through a plurality of nitrogen diffusers. The oil may be cooled to about 72° F.-80° F. In various embodiments, the cooling chamber (90) cools the oil to approximately 72° F.-75° F. In certain embodiments, the cooling chamber (90) cools the oil to approximately 73° F. The filter bank may include a 1-20 micron filter.

In another aspect, the invention provides a system for treating oil. The system includes a line for inputting oil, a heating coil having an input and an output, wherein the input is in fluid communication with the line, and the heating coil is configured for heating the inputted oil, an air injection passage in fluid communication with the output of the heating coil, the air injection passage comprising a plurality of sintered metal injectors configured to aerate the heated oil, a vacuum chamber in fluid communication with an output of the air injection passage, and configured to condense the aerated oil, a cooling chamber in fluid communication with an output of the vacuum chamber, and configured to cool the condensed oil, a chamber containing sintered metal in fluid communication with an output of the cooling chamber, an electrifier in fluid communication with an output of the cooling chamber, and configured to subject the cooled oil to an electrical field, and a filter bank in fluid communication with an output of the electrifier, and configured to filter the electrified oil. The oil may be used oil. In various embodiments, the heating coil may be configured to heat the inputted oil to about 82° F.-100° F. In various embodiments, the heating coil may be configured to heat the inputted oil to about 85° F.-90° F. In certain embodiments, the heating coil may be configured to heat the inputted oil to about 88° F. In various embodiments, the air injection passage comprises a plurality of nitrogen diffusers in contact with the heated oil. The cooling chamber may be configured to cool the oil to about 72° F.-80° F. In various embodiments, cooling chamber may be configured to cool the oil to about 72° F.-75° F. In certain embodiments, cooling chamber may be configured to cool the oil to about 73° F. In various embodiments, the electrifier comprises sintered copper in contact with the condensed oil, and is configured to generate a 0-90 volt electrical field through the sintered copper. In various embodiments, the electrifier comprises sintered titanium in contact with the condensed oil, and is configured to generate a 0-250 volt electrical field through the sintered titanium. The filter bank may include a 1-20 micron filter.

DETAILED DESCRIPTION OF THE INVENTION

The present invention is based on the finding that used oil can be treated for removal of halogen and/or sulfur content.

Before the present compositions and methods are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

The term "comprising," which is used interchangeably with "including," "containing," or "characterized by," is inclusive or open-ended language and does not exclude additional, unrecited elements or method steps. The phrase "consisting of" excludes any element, step, or ingredient not specified in the claim. The phrase "consisting essentially of" limits the scope of a claim to the specified materials or steps and those that do not materially affect the basic and novel characteristics of the claimed invention. The present disclosure contemplates embodiments of the invention compositions and methods corresponding to the scope of each of these phrases. Thus, a composition or method comprising recited elements or steps contemplates particular embodiments in which the composition or method consists essentially of or consists of those elements or steps.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

Used oil is any oil refined from crude oil or any synthetic oil that has been used and as a result of such use is contaminated by physical or chemical impurities. Used oils include spent automotive lubricating oils, spent industrial oils, and spent industrial process oils. Thus, the definition of used oil includes oil used for the purpose of lubrication that becomes contaminated as a result of such use and residues and sludges derived from used oil.

The halogen family, or Group VIIA on the periodic table of elements, includes fluorine, chlorine, bromine, iodine, and astatine. Chemicals containing both a halogen atom and a carbon atom are called "organic halogens." Examples of organic halogens include short chain alkanes like 1,2-dichloroethane, hexachloroethane, and short chain (C10-C13) chlorinated paraffins. Chemicals containing an atom from the halogen family but no carbon atoms are "inorganic halogens." Examples of inorganic halogens include sodium chloride (table salt) and thallium chloride. Total halogens include organic and inorganic halogens, except as noted in analytical procedures. EPA proposed regulating total chlorine in used oil but finalized the regulatory term as "total halogens" after comments submitted in response to the proposed rule indicated that most "total chlorine" analytical methods actually measure halogens other than chlorine only.

Used oil handlers may determine whether the total halogen content is above or below 1,000 ppm by (1) testing the used oil or (2) applying knowledge of the halogen content of the used oil in light of the materials or processes used. If testing to determine the total halogen content of a used oil waste stream, handlers should properly sample and analyze the used oil using a total halogen test method.

Figure 1:
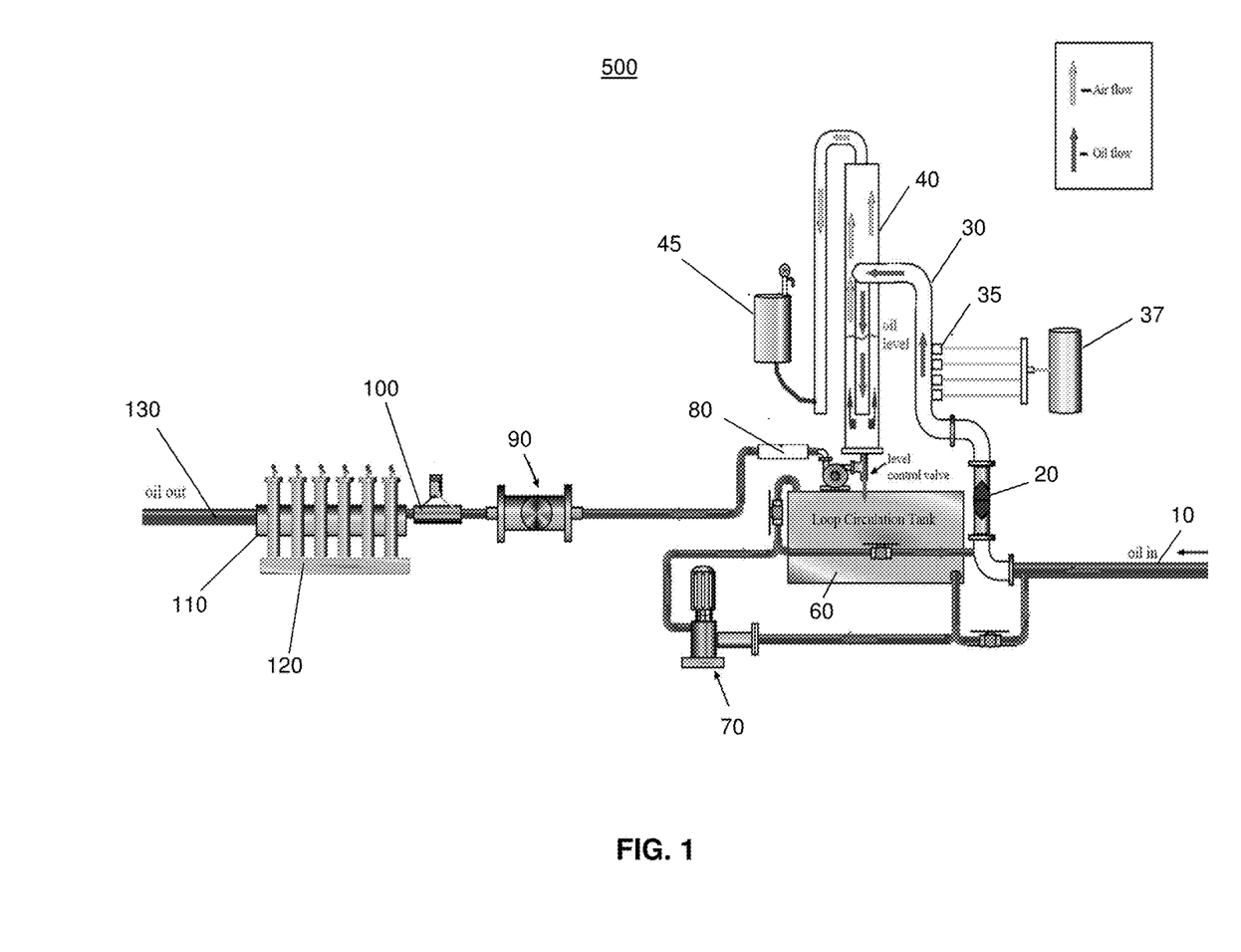
FIG. 1 is a pictorial diagram showing a halogen removal system.
Figure 2:
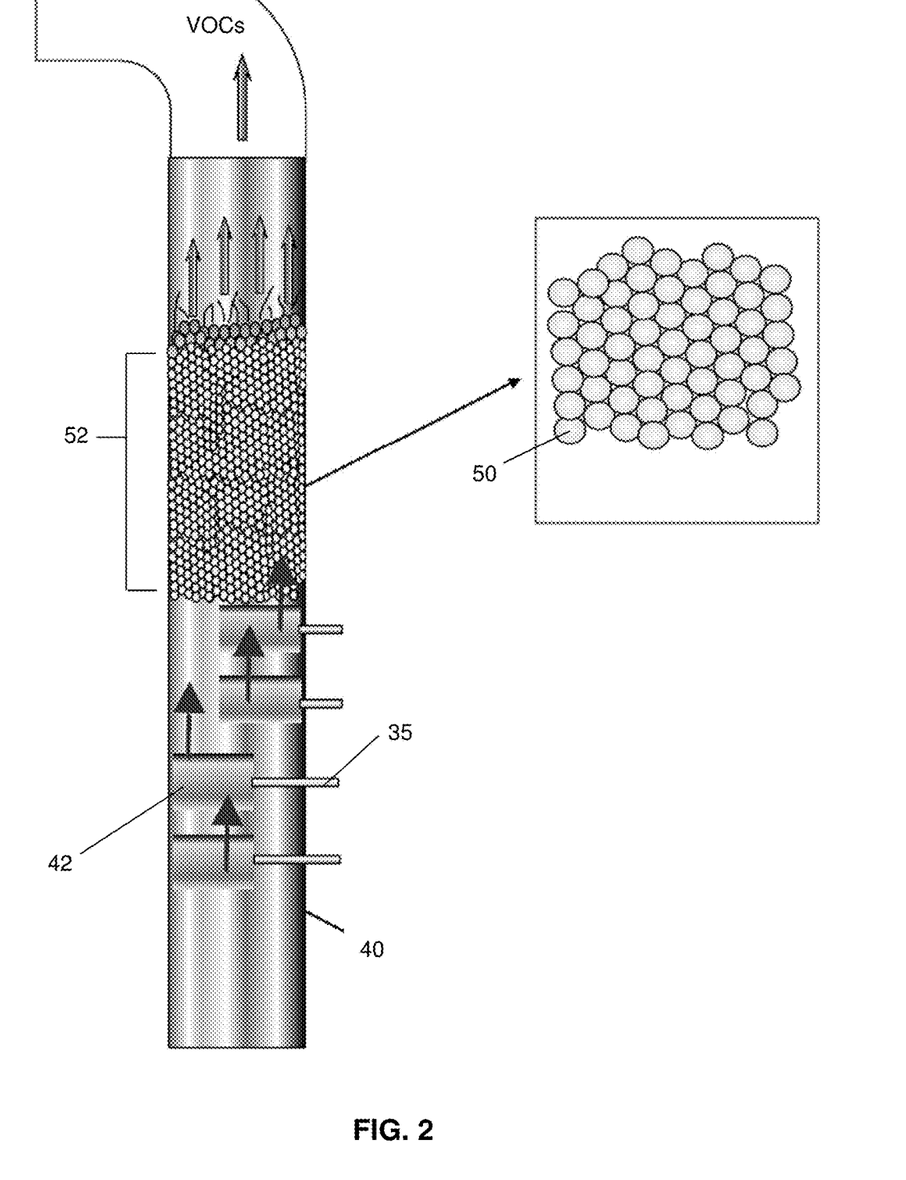
FIG. 2 is a cross-sectional view of a vacuum column showing air injection ports and nitrogen diffusers used to aerate the oil to form oil foam.
Figure 4A:
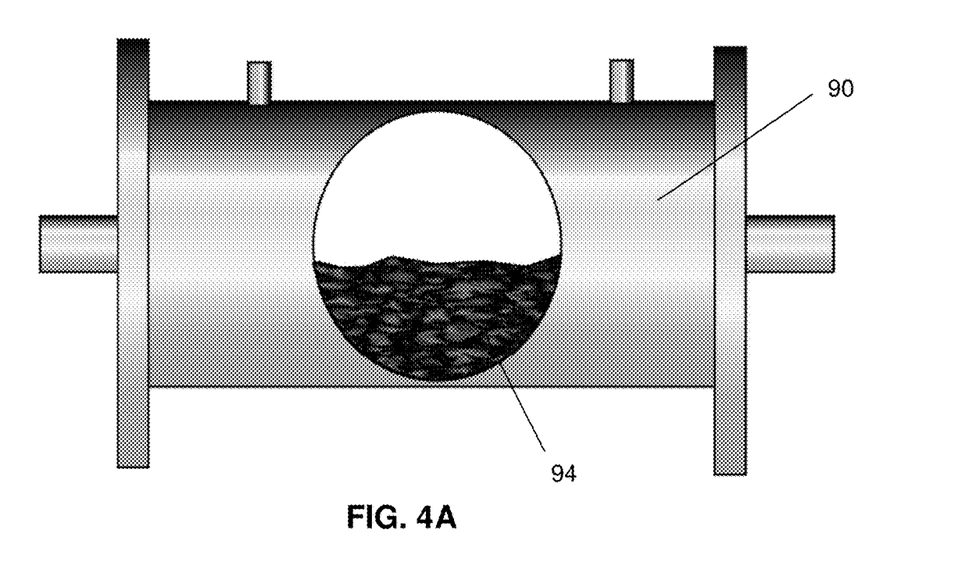
FIGS. 4A and 4B are perspective and cross-sectional views of a cooling chamber.
Figure 4B:
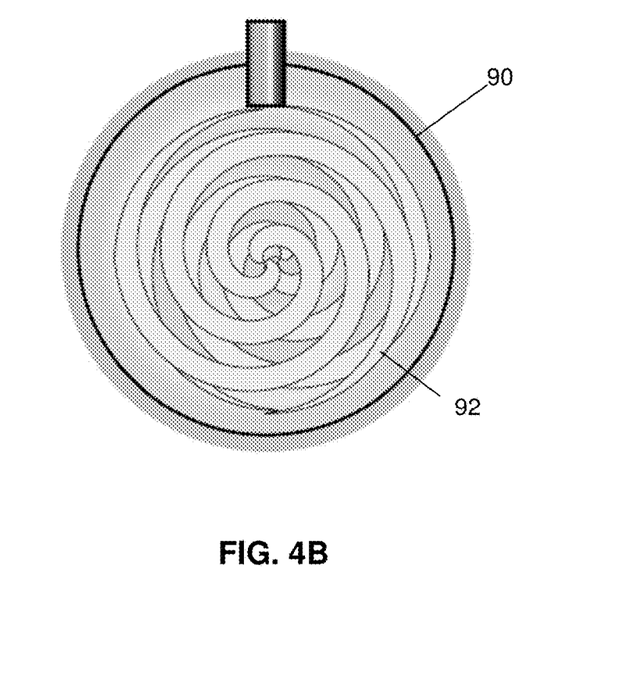

Referring to FIG. 1, an oil treatment system (500) is shown. The system is configured to convert halogens back to sodium which are then crystalized, captured and removed via a filter bank. Used oil enters the system through a pipe (10) (denoted as "oil in"), and flows through a heating coil (20) where it is heated to approximately 82° F.-100° F. In various embodiments, the temperature is raised to approximately 85° F.-90° F. In certain embodiments, the temperature is raised to approximately 88° F. From the heating coil, the oil passes through an air injection passage (30) of a vacuum column (103) where a plurality of sintered metal air injectors (35) aerate the heated oil using a low-volume air compressor (37). As shown in FIG. 4, the air injectors (35) aerate the heated oil through nitrogen diffusers (42) connected thereto, and produce uniform air bubbles (50) of approximately 1/32" diameter or less. In various embodiments, the uniform bubbles are approximately 1/32" in diameter. In various embodiments, the nitrogen diffusers (42) are formed from sintered brass. The resulting air bubbles form an oil foam (52) and provide for thin film exposure of the used oil, thereby maximizing exposure of the oil to the electromagnetic treatment within the column (103). A vacuum is simultaneously applied to the column (103) using a vacuum pump (45), resulting in rapid expansion and vaporization of the used oil as a result of artificial heat. The rapid vaporization reduces the surface tension of the oil foam, thereby creating a thinner bubble wall to speed up molecular movement. As the oil foam is exposed to the non-flooded portion of the vacuum tower (i.e., the controlled oil level at approximately mid-point of the vacuum chamber (40)), the bubbles rapidly expand and go into a violent vaporization state, thereby removing volatile organic compounds (VOCs) from the oil. These VOCs are thereafter captured in the vacuum pump (45) filtering system (not shown) prior to being exhausted to the atmosphere. In various embodiments, the vacuum chamber (103) is a tower that may be approximately 15-20 feet high to allow for sufficient vaporization and subsequent condensation of the foamed oil.

Figure 3:
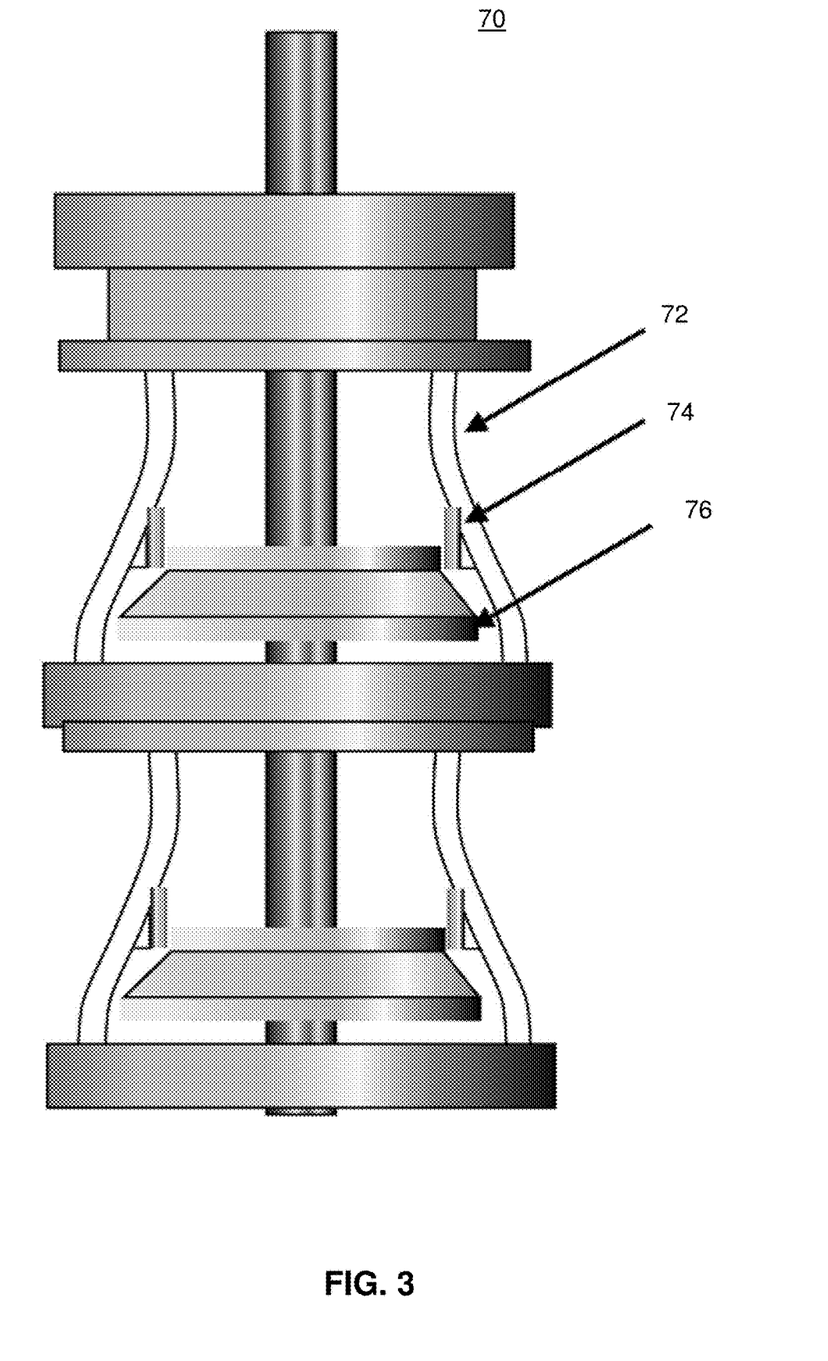
FIG. 3 is a pictorial diagram showing a pump for creating eddy current.

The condensed oil is then fed into an oil circulation tank (60) through a level control valve. From the oil circulation tank (60), the oil may be recirculated to the input of the heating coil (20) by a vertical can pump (70). In various embodiments, the vertical pump (70) may pump at approximately 10 gallons per minute (gpm) to 750 gpm. In various embodiments, the vertical pump may pump at approximately 100 gpm to 500 gpm. In certain embodiments, the vertical pump may pump at approximately 300 gallons per minute. The vertical pump (70) may include a cast iron bowl (72), stainless steel wear ring (74), and bronze impeller (76), as shown in FIG. 3. The vertical pump (70) may also be used to create an eddy current (DC), thereby subjecting the oil stream to electrolysis without additional power sources. Thus, the eddy current created by the vertical pump (70) provides for modification of the electronegative characteristics within the oil stream.

From the oil circulation tank (60), the oil may also flow through a sintered stainless tube (80) and into a cooling chamber (90). Without being bound by theory, the positive charge of the sintered stainless makes it possible to change the electrical polarities or pulse positive/negative current in the oil, thereby disrupting the electromagnetic field that holds the oil molecules together. As such, the sintered metal provides additional electrical influence to the oil stream without the need for additional power sources. As shown in FIGS. 4A and 4B, the heated oil is cooled in cooling chamber (90) by contact with the plurality of cooling tubes (92) disposed within the cooling chamber (90). The cooling chamber (90) may be further used to slow down molecular movement of the oil stream (94), thereby increasing and accelerating crystallization and pairing/gathering of halogens. Without being bound by theory, the resulting reduction in DC voltage within the oil stream urges separated elements (i.e., halogens) back to their crystalline (i.e., salt) state. In various embodiments, the cooling chamber (90) cools the oil to approximately 72° F.-80° F. In various embodiments, the cooling chamber (90) cools the oil to approximately 72° F.-75° F. In certain embodiments, the cooling chamber (90) cools the oil to approximately 73° F.

Figure 5A:
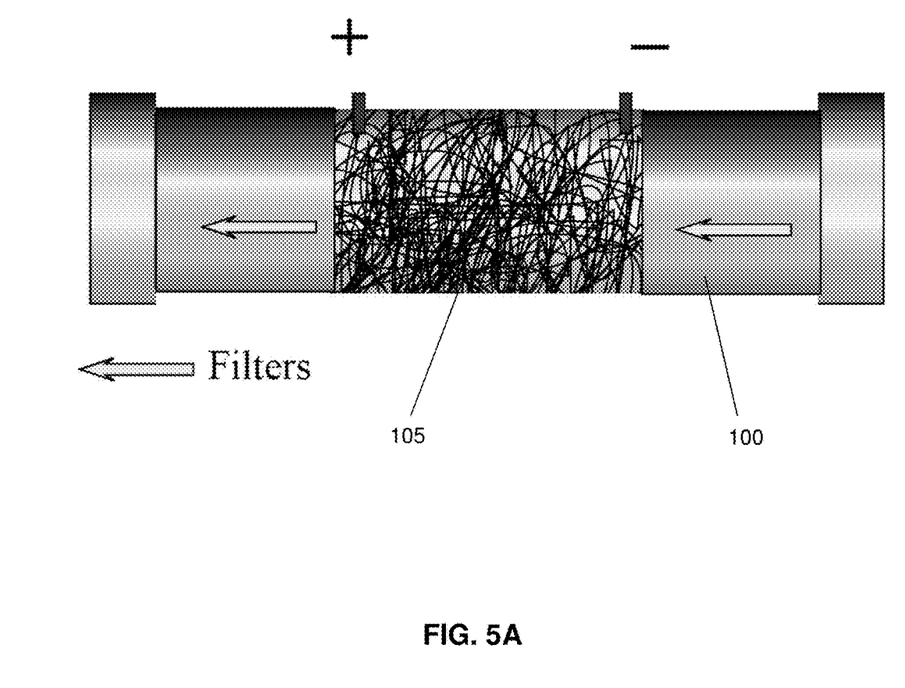
FIG. 5A is a pictorial diagram showing a cross-sectional view of an electrifier containing a sintered metal.
Figure 5B:
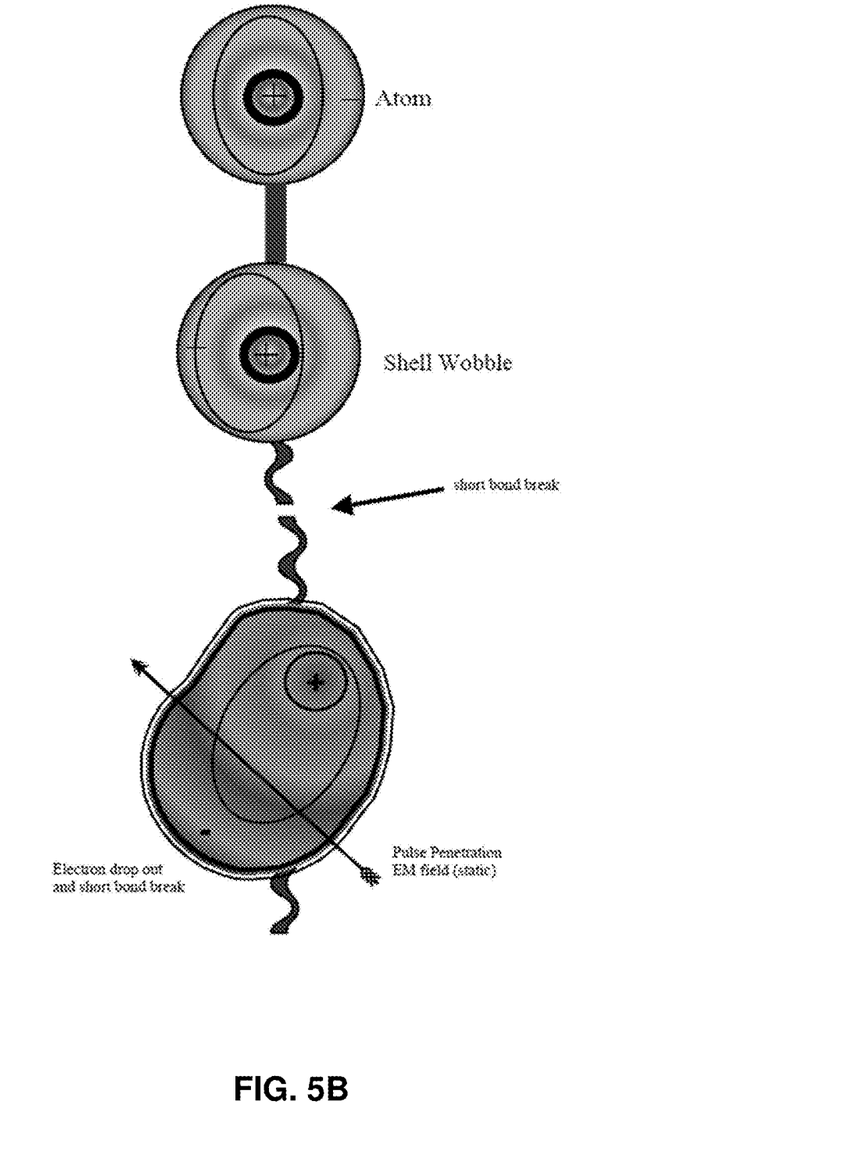
FIG. 5B is a pictorial diagram showing the creation of atomic shell wobble as a result of subjecting the oil to an electric field.

After being cooled, the oil passes through an electrifier (100) wherein the oil is subjected to electrical treatment. As shown in FIGS. 1 and 5A, a DC power supply creates a short-lived electrical DC current through sintered metal wiring (105) disposed therein. The electrical current creates polar instability within the oil stream, thereby creating atomic shell wobble, as shown in FIG. 5B. Without being bound by theory, because the DC current flows through sintered metal, the current may travel in many directions within the oil stream, thereby creating a pulsing electromagnetic field. The electromagnetic pulse changes the shape of the atomic shells and subshells of the oil molecules. When the orbit of the electrons is elongated by the controlled electrical pulse, electrons are able to drop out of their orbit, thereby changing the atomic structure of the molecule.

Figure 6:
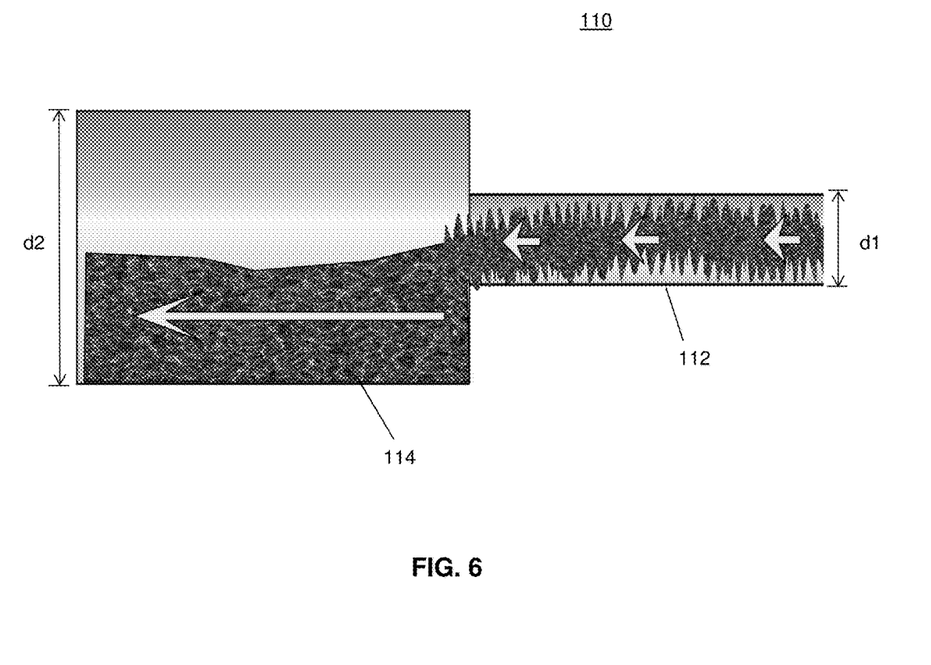
FIG. 6 is a cross-sectional view of a gathering chamber.

In certain embodiments, a 0-90 volt electrical field is produced through sintered copper in the system. In other embodiments, a 0-250 volt electrical field is produced through sintered titanium in the system. The oil is then collected in a gathering chamber (110) to smooth the flow of oil. The gathering chamber (110) may include an input tube (112) of a first diameter (d1) and an output tube (114) of a second diameter (d2), where the first diameter (d1) is smaller than the second diameter (d2) in order to convert the inputted turbulent flow of the oil into laminar flow. In various embodiments, the first diameter may be approximately one inch to 5 inches, while the second diameter is approximately 6 inches to 12 inches. In certain embodiments, the first diameter may be two inches, while the second diameter is approximately eight inches.

The gathered oil is then filtered through a filter bank (120) to remove crystalized non-metal elements, such as halogens, from the used oil. In various embodiments, the filter bank (120) may be a 900 gpm filter bank containing 1-20 micron filter bags. The filtered oil may then be collected for future use through output tube (130) (denoted at "oil out" in FIG. 1). When the treated oil is used or burnt, it does not create dioxin, and yields an oil product having 50% to 90% of the sulfur removed therefrom.

In another aspect, the present invention provides a method of treating oil. As discussed above, the treated oil does not create dioxin, and has 50% to 90% of the sulfur removed therefrom. The method includes heating oil in need of treatment to approximately 82° F.-100° F. and aerating the heated oil to create an oil foam. In various embodiments, the temperature is raised to approximately 85° F.-90° F. In certain embodiments, the temperature is raised to approximately 88° F. The foamed oil is then subject to a vacuum to remove the air and condense the oil. The oil is contacted with sintered stainless steel and cooled to approximately 72° F.-80° F. In various embodiments, the cooling chamber (90) cools the oil to approximately 72° F. to 75° F. In certain embodiments, the cooling chamber (90) cools the oil to approximately 73° F.

The cooled oil is then subjected to an electric field. As described above, the electric field may be a 0-90 volt DC electrical field produced through sintered copper. In other embodiments, the electric field may be a 0-250 DC volt electrical field produced through sintered titanium. The flow of the electrified oil is then smoothed by passing the oil through a gathering chamber. Finally, the electrified oil is filtered to remove crystalized halogens and/or sulfur. In various embodiments, the electrified oil may be filtered through a 900 gpm filter bank containing 1-20 micron filter bags. The filtered oil may then be collected for future use.

Although the invention has been described with reference to the above example, it will be understood that modifications and variations are encompassed within the spirit and scope of the invention. Accordingly, the invention is limited only by the following claims.

What is claimed is:

1. A method of treating oil to remove halogens and sulfur, comprising:
    (a) heating an oil to be treated;
    (b) aerating the heated oil to create an oil foam of substantially uniform air bubbles;
    (c) subjecting the oil foam to a vacuum to rapidly expand the oil foam and generate additional heat which vaporizes the oil foam, thereby reducing surface tension of the oil foam, removing volatile organic compounds from the oil foam, and condensing the oil;
    (d) contacting the condensed oil with a sintered metal to disrupt electromagnetic forces within the condensed oil, thereby allowing flocculation of halogens and sulfur contained in the condensed oil;
    (e) cooling the condensed oil to crystallize the halogens and sulfur;
    (f) subjecting the cooled oil to an electrical field resulting in polar instability within the cooled oil, thereby changing atomic structures of molecules in the cooled oil and crystallizing any uncrystalized halogens and sulfur; and
    (g) filtering the electrified oil to remove crystalized halogens and sulfur.

2. The method of claim 1, wherein the oil to be treated is a used oil selected from the group consisting of spent automotive lubricating oils, spent industrial oils, and spent industrial process oils.

3. The method of claim 1, wherein the oil is heated to about 82° F.-100° F.

4. The method of claim 3, wherein the oil is heated to about 88° F.

5. The method of claim 1, wherein the step of aerating includes contacting the oil with a plurality of diffusers while pumping air through the diffusers.

6. The method of claim 1, wherein the sintered metal is sintered stainless steel.

7. The method of claim 1, wherein the oil is cooled to about 72° F.-80° F.

8. The method of claim 7, wherein the oil is cooled to about 73° F.

9. The method of claim 1, wherein the electrical field is a 0-90 volt electrical field is produced through sintered copper.

10. The method of claim 1, wherein the electrical field is a 0-250 volt electrical field is produced through sintered titanium.

11. The method of claim 1, wherein the electrified oil is filtered using a filter bank, wherein the filter bank comprises one or more 1-20 micron filters.

12. The method of claim 1, wherein the oil foam is subjected to the vacuum within a vacuum tower that is about 15-20 feet high.

13. The method of claim 1, wherein the substantially uniform air bubbles have a diameter of about 1/32".

\* \* \* \* \*